United States Patent
DiMassimo et al.

(10) Patent No.: US 10,358,357 B2
(45) Date of Patent: Jul. 23, 2019

(54) ENERGY EFFICIENT SYSTEM AND PROCESS FOR HYDROLYZING SLUDGE

(71) Applicant: Veolia Water Solutions & Technologies Support, Saint-Maurice (FR)

(72) Inventors: Richard W. DiMassimo, Raleigh, NC (US); Soren J. Hojsgaard, Hillerod (DK); Jens Christian Bisgaard, Copenhagen (DK)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 0 days.

(21) Appl. No.: 15/746,432

(22) PCT Filed: Jul. 21, 2016

(86) PCT No.: PCT/US2016/043300
§ 371 (c)(1),
(2) Date: Jan. 22, 2018

(87) PCT Pub. No.: WO2017/023561
PCT Pub. Date: Feb. 9, 2017

(65) Prior Publication Data
US 2018/0201517 A1    Jul. 19, 2018

Related U.S. Application Data

(60) Provisional application No. 62/199,273, filed on Jul. 31, 2015.

(51) Int. Cl.
*C02F 1/02* (2006.01)
*C02F 1/06* (2006.01)
(Continued)

(52) U.S. Cl.
CPC .............. *C02F 1/025* (2013.01); *C02F 3/006* (2013.01); *C02F 11/04* (2013.01); *C02F 11/18* (2013.01);
(Continued)

(58) Field of Classification Search
CPC .... C02F 1/025; C02F 1/06; C02F 1/42; C02F 1/44; C02F 3/006; C02F 11/04;
(Continued)

(56) References Cited

U.S. PATENT DOCUMENTS 8,043,505 B2   10/2011   Noguchi et al.
8,551,337 B2   10/2013   Noguchi et al.
(Continued)

FOREIGN PATENT DOCUMENTS

JP    H02293100 A    12/1990
JP    H0894058 A     4/1996
(Continued)

*Primary Examiner* — Lucas A Stelling
(74) *Attorney, Agent, or Firm* — Coats & Bennett PLLC

(57) ABSTRACT

The present process relates to thermally hydrolyzing sludge in a thermal hydrolysis system. A flash tank or waste heat boiler is located downstream of the thermal hydrolysis system. Hydrolyzed sludge is continuously directed into the flash tank or waste heat boiler for recovering supplemental steam. The supplemental steam is used independently or in combination with live steam produced by a main boiler to heat sludge being directed into the thermal hydrolysis system.

24 Claims, 11 Drawing Sheets

(51) Int. Cl.
  *C02F 1/42* (2006.01)
  *C02F 1/44* (2006.01)
  *C02F 3/00* (2006.01)
  *C02F 11/04* (2006.01)
  *C02F 11/18* (2006.01)
  C02F 103/02 (2006.01)

(52) U.S. Cl.
  CPC .......... *C02F 1/06* (2013.01); *C02F 1/42* (2013.01); *C02F 1/44* (2013.01); *C02F 2103/02* (2013.01); *C02F 2209/001* (2013.01); *C02F 2209/02* (2013.01); *C02F 2209/03* (2013.01); *C02F 2209/40* (2013.01); *C02F 2209/42* (2013.01); *C02F 2301/106* (2013.01); *C02F 2303/10* (2013.01); *Y02W 10/30* (2015.05)

(58) Field of Classification Search
  CPC ......... C02F 11/06; C02F 11/08; C02F 11/086; C02F 11/11; C02F 2103/02; C02F 2209/001; C02F 2209/02; C02F 2209/03; C02F 2209/40; C02F 2209/42; C02F 2301/066; C02F 2301/106; C02F 2303/10; Y02W 10/30
  See application file for complete search history.

(56) References Cited

U.S. PATENT DOCUMENTS

| | | |
|---|---|---|
| 9,527,760 B2 | 12/2016 | Hojsgaard et al. |
| 9,751,791 B2 * | 9/2017 | Gonzalez Calvo ..... C02F 11/18 |
| 2012/0111515 A1 * | 5/2012 | Nilsen ................... C02F 1/025 162/68 |
| 2015/0122746 A1 | 5/2015 | Nawawi-Lansade et al. |
| 2016/0214880 A1 | 7/2016 | Chauzy et al. |

FOREIGN PATENT DOCUMENTS

| | | |
|---|---|---|
| JP | H10337596 A | 12/1998 |
| JP | 2004016844 A | 1/2004 |
| JP | 2009101293 A | 5/2009 |
| JP | 2009120746 A | 6/2009 |

* cited by examiner

ENERGY EFFICIENT SYSTEM AND PROCESS FOR HYDROLYZING SLUDGE

This application is a U.S. National Stage Application of PCT Application No. PCT/US2016/043300, with an international filing date of 21 Jul. 2016. Applicant claims priority based on U.S. Provisional Patent Application No. 62/199, 273 filed 31 Jul. 2015. The subject matter of these applications is incorporated herein.

FIELD OF THE INVENTION

The present invention relates to systems and processes for treating sludge or organic waste, and more particularly to a system and process for thermally hydrolyzing sludge or organic waste.

BACKGROUND OF THE INVENTION

Various systems and processes are employed to treat sludge and organic waste. For example, sludge and organic waste are sometimes subjected to a thermal hydrolysis process which may occur before or after anaerobic digestion. A thermal hydrolysis process causes cell walls to rupture under conditions of high temperature and high pressure and generally results in highly solubilized sludge which is more easily biodegradable. In particular, thermal hydrolysis employs high temperatures in the range of 130° C. to 180° C. and high pressure, typically in the range of 3-10 bar abs. When used in conjunction with anaerobic digestion, a thermal hydrolysis process decouples long chain polymers and hydrolyzes proteins and generally thermal hydrolysis transforms the sludge or organic waste in ways that makes anaerobic digestion more efficient.

Thermal hydrolysis processes consume huge amounts of energy. Temperature and pressure in the desired ranges for hydrolysis of sludge is typically created by injecting and mixing steam with the sludge in a hydrolysis reactor. Steam injection is a highly energy intensive aspect of sludge hydrolysis and waste energy recovery is a matter of significant concern relative to sludge hydrolysis. In some instances, it is known to partly recover energy by flashing off the steam into the incoming sludge in a batch hydrolysis process or by heating boiler feed water for the production of new steam. These processes are characterized by less than desirable efficiency and very high cost.

Therefore, there is and continues to be a need to improve the energy efficiency of thermal hydrolysis systems and processes.

SUMMARY OF THE INVENTION

The present invention relates to a thermal hydrolysis system and process for hydrolyzing sludge or organic waste that, on a continuous basis, recovers a substantial amount of the energy used in the thermal hydrolysis process.

In some embodiments, hydrolyzed sludge is directed to a waste heat boiler and used to heat boiler feedwater and form steam that is used to heat sludge being directed into the thermal hydrolysis system. In some cases, steam produced by the waste heat boiler is combined with steam produced by a main boiler.

In other embodiments, a flash tank is disposed downstream of the thermal hydrolysis system. Hydrolyzed sludge is continuously directed into the flash tank and by providing a controlled pressure drop between the thermal hydrolysis system and the flash tank, steam is continuously flashed in the flash tank. This steam is recovered and used independently or in combination with steam produced by the main boiler to heat sludge being directed into the thermal hydrolysis system.

In addition, disclosed herein are several options for efficiently mixing steam generated by the waste heat boiler, flash tank or main boiler with the sludge being directed into the thermal hydrolysis system.

In one embodiment, the present invention entails an energy efficient method for thermally hydrolyzing sludge. This method includes directing the sludge into one or more steam-sludge mixers. From the steam-sludge mixers, the sludge is directed to a thermal hydrolysis system where the sludge is thermally hydrolyzed and forms thermally hydrolyzed sludge. In the process, there is a main boiler. A first feed water is directed to the main boiler and the main boiler produces live steam. In addition, the method utilizes the heat associated with the thermally hydrolyzed sludge to produce supplemental steam. The method further comprises combining the live steam and the supplemental steam to form a steam mixture and mixing the steam mixture with the sludge in at least one of the steam-sludge mixers or alternatively, separately mixing the live steam and the supplemental steam in the one or more steam-sludge mixers. By separately mixing, it is meant that the live and supplemental steam is mixed with the sludge before the live and supplemental steam are mixed together. One example of this is where live steam is directed into one mixer and supplemental steam is directed into another mixer. The method described herein can produce the supplemental steam by one of two processes. First, this can be achieved by directing the thermally hydrolyzed sludge from the thermal hydrolysis system to and through a waste heat boiler and feeding a second feed water into and through the waste heat boiler to produce the supplemental steam. The second option is to direct the thermally hydrolyzed sludge from the thermal hydrolysis system to a flash tank and through a pressure drop between the thermal hydrolysis system and the flash tank producing the supplemental steam in the flash tank.

In another embodiment of the present invention, the method entails an energy efficient process for thermally hydrolyzing sludge by directing sludge into a steam-sludge mixer and thereafter directing the sludge to a downstream thermal hydrolysis system that produces thermally hydrolyzed sludge. The method entails feeding a first feed water to a main boiler and producing live steam. The method further includes utilizing heat associated with the thermally hydrolyzed sludge to generate supplemental steam. This is achieved by directing the thermally hydrolyzed sludge into and through a waste heat boiler and feeding a second feed water into and through the waste heat boiler and heating the second feed water to produce the supplemental steam. The method also includes directing the live steam from the main boiler through a steam line having a steam injector therein. The supplemental steam is injected into the steam line via a steam injector and mixed with the live steam to form a steam mixture in the steam line. The method entails directing the steam mixture into the steam-sludge mixer located upstream of the thermal hydrolysis system and mixing the steam mixture with the sludge therein.

In another embodiment of the present invention, the method for thermally hydrolyzing sludge includes directing the sludge into one or more steam-sludge mixers. Then the sludge is directed from at least one of the mixers to a thermal hydrolysis system which produces thermally hydrolyzed sludge. There is a main boiler that receives a feed water and produces live steam. This live steam is directed from the main boiler through a steam line to one or more of the steam-sludge mixers located upstream of the thermal hydrolysis system. The method further includes utilizing the heat associated with the thermal hydrolysis system to generate supplemental steam. This is achieved by directing the thermally hydrolyzed sludge into a flash tank and maintaining a pressure drop between the thermal hydrolysis system and the flash tank so as to cause the flash tank to produce the supplemental steam. Thereafter, the method entails directing the supplemental steam from the flash tank to at least one of the steam-sludge mixers located upstream of the thermal hydrolysis system.

Other objects and advantages of the present invention will become apparent and obvious from a study of the following description and the accompanying drawings which are merely illustrative of such invention.

DESCRIPTION OF EXEMPLARY EMBODIMENTS

Figure 1:
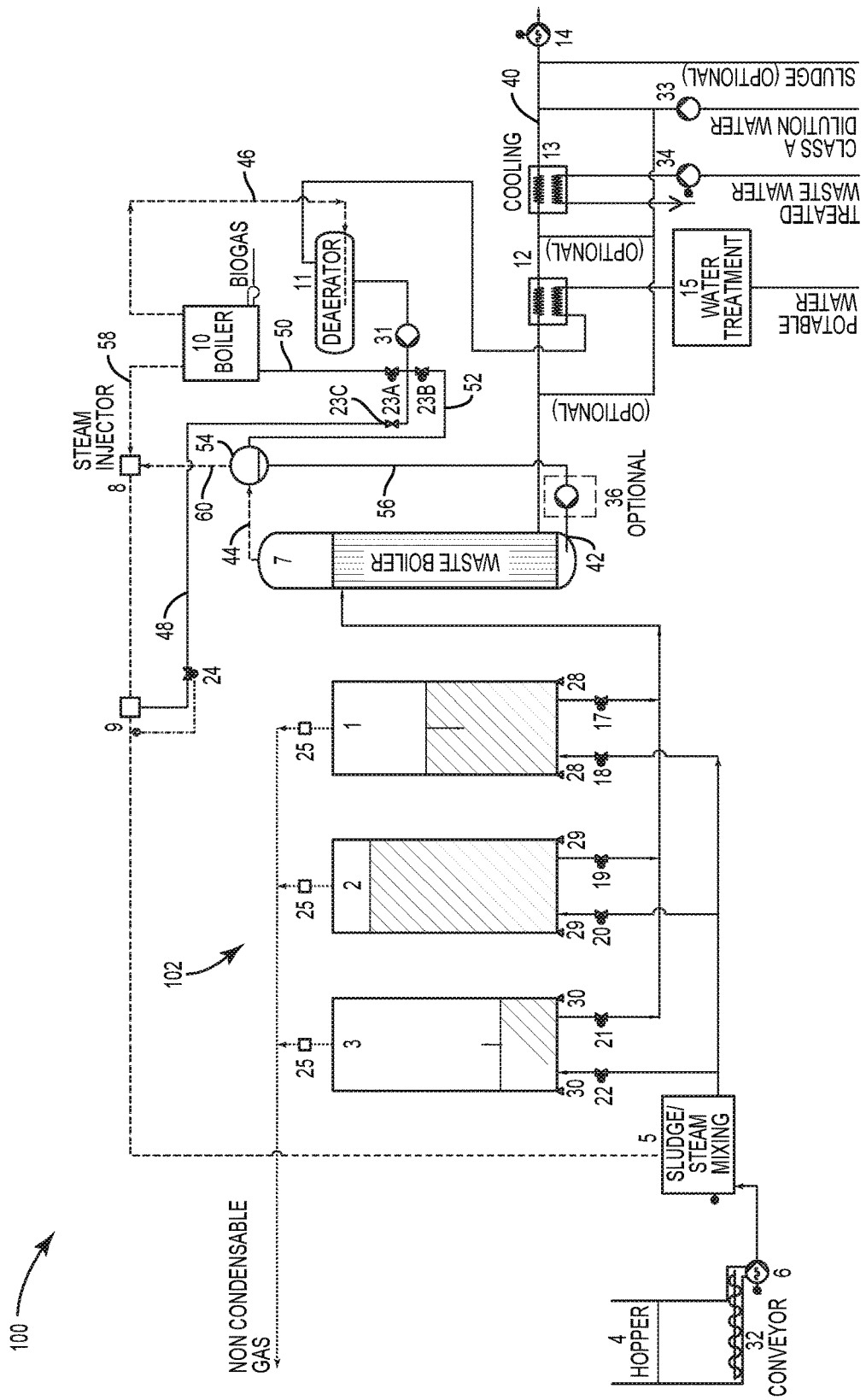
FIG. 1 is a schematic drawing showing an exemplary thermal hydrolysis process utilizing a waste heat boiler to generate steam that is used for heating sludge being directed to a thermal hydrolysis system.
Figure 2:
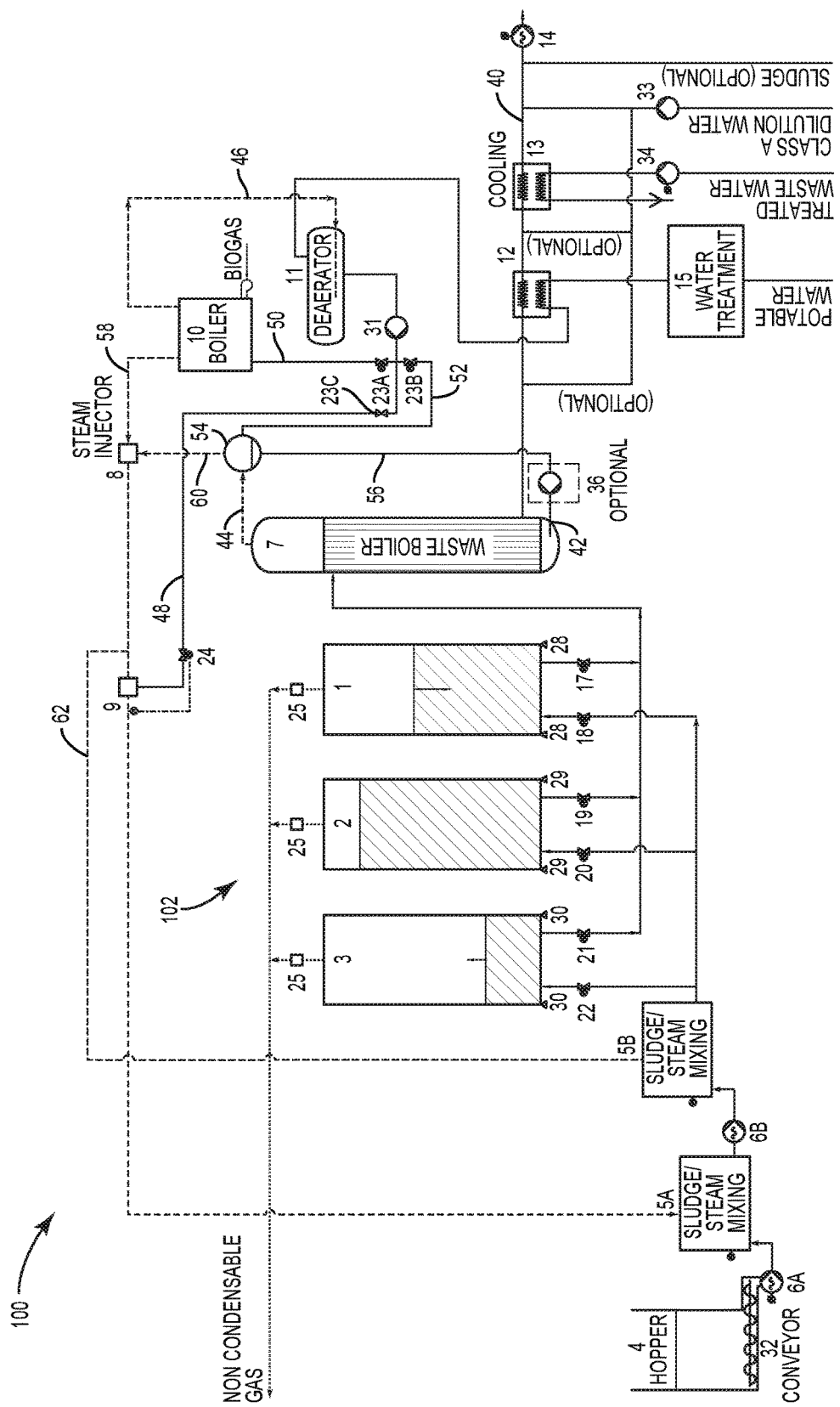
FIG. 2 is similar to FIG. 1 but shows an alternative method.
Figure 3:
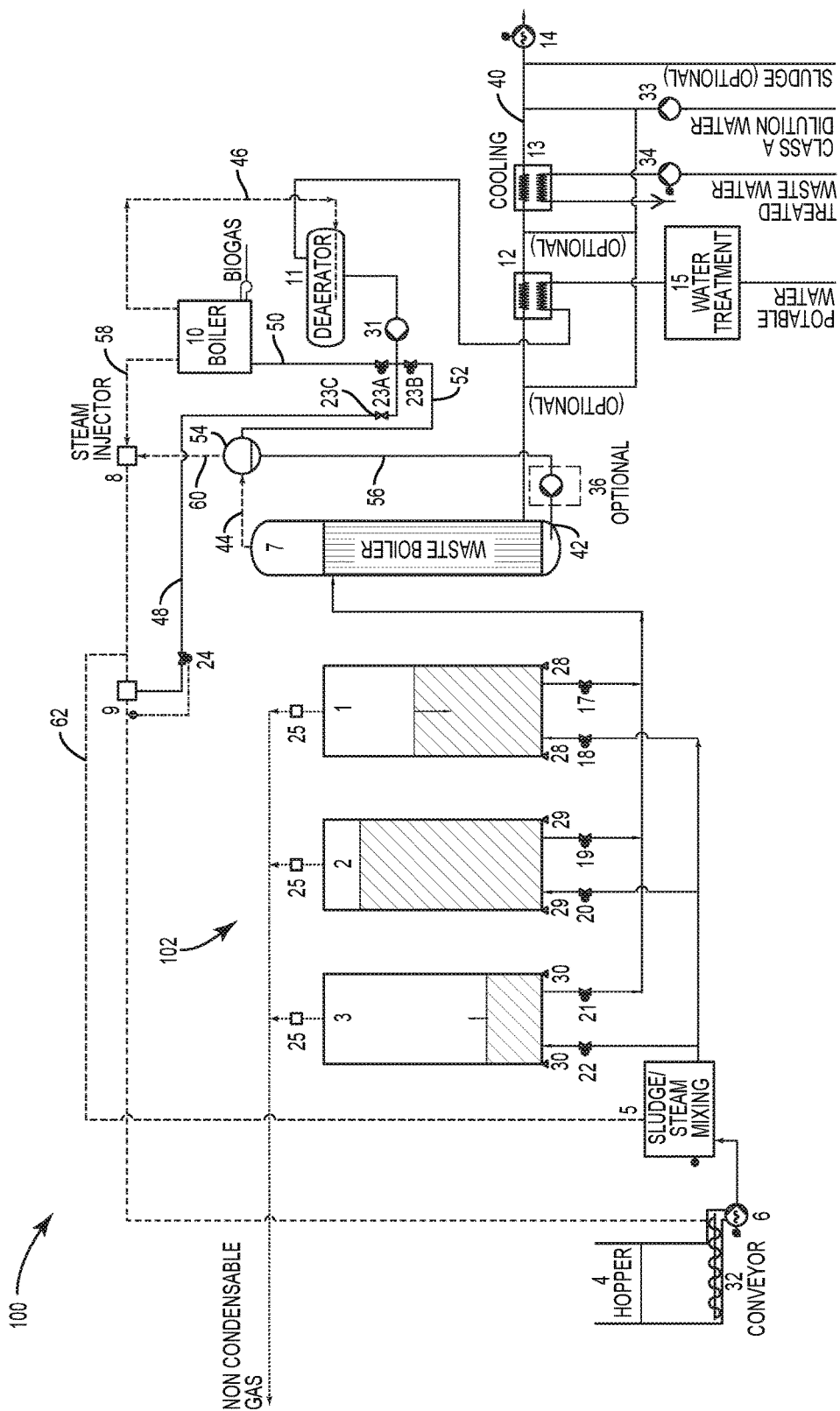
FIG. 3 is another schematic illustration of an exemplary thermal hydrolysis process that is similar in many respects to the processes shown in FIGS. 1 and 2.

With further reference to the drawings, a system for treating sludge or organic waste is shown therein and indicated generally by the numeral 100. The term "sludge" is used herein and encompasses organic waste. With particular reference to FIGS. 1-3, it is seen that the system 100 for treating sludge includes a hopper 4 for receiving and holding sludge and a conveyor 32 disposed in the bottom of the hopper for conveying sludge therefrom. Disposed on the outlet side of the conveyor 32 is a pump 6 which may comprise a progressive cavity pump. Pump 6 is operative to pump sludge to a sludge-steam dynamic mixing unit 5. Typically the retention time of the sludge and steam in the mixing unit 5 is less than 5 minutes and the speed of the rotor in the mixing unit is greater than 2,000 revolutions per minute. In the embodiment illustrated in FIG. 2, there is provided a pair of sludge-steam mixing units 5A and 5B. In the FIG. 2 embodiment, there is provided a pump 6B operatively interconnected between the mixing units 5A and 5B.

Downstream of the sludge-steam mixing unit is a thermal hydrolysis system indicated generally by the numeral 102. In the case of the embodiments illustrated herein, the thermal hydrolysis system 102 comprises three batch reactors or tanks 1, 2 and 3. A series of sludge inlet lines 18, 20 and 22 are operatively interconnected between the reactors 1, 2, and 3 and the sludge-steam mixing unit 5. In addition, there is a series of sludge outlet lines 17, 19 and 21 that extend from the reactors 1, 2, and 3 and are employed for conveying sludge from the respective reactors. In addition, each thermal hydrolysis reactor 1, 2, or 3 includes a vapor outlet valve 25 for discharging non-condensable gases from the reactors.

Sludge outlet lines 17, 19 and 21 lead to a waste heat boiler 7. Waste heat boiler 7 can assume various designs and forms. In one exemplary design, the waste heat boiler 7 includes a series of tubes that extend through a substantial portion of the boiler. As seen in FIG. 1, the waste heat boiler 7 includes a sludge outlet that connects to line 40 that extends through or in operative relationship with two heat exchangers, heat exchangers 12 and 13. Downstream of the heat exchanger 13 is a pump 14 for pumping the sludge in line 40, in one example, to an anaerobic digester (not shown). In addition, waste heat boiler 7 includes a feedwater inlet 42 and a steam outlet line 44. The thermal hydrolysis system 100 can be employed with or without an anaerobic digesting process. Furthermore, even when employed in conjunction with an anaerobic digester, the thermal hydrolysis system 100 can be employed upstream or downstream of the anaerobic digester.

The system and process disclosed herein employs various means to cool the sludge in sludge outlet line 40. In one embodiment, a pump 34 is employed to direct treated wastewater through the cooling heat exchanger 13 for the purpose of cooling sludge passing therethrough. In addition, there are some cases where it may be desirable to dilute the sludge passing in line 40. In this case, a class A dilution water can be pumped by pump 33 and injected at one or more locations along sludge outlet line 40.

In addition to the waste heat boiler 7, there is also provided a main boiler 10 for generating steam that is used to mix with the incoming sludge. Accordingly, boiler feedwater, potable water, is pumped to a water treatment unit 15 for treating the feedwater prior to the feedwater being introduced into either boiler. After treatment in the water treatment unit 15, the boiler feedwater is directed through heat exchanger 12 and generally functions to provide additional cooling to the sludge passing through sludge outlet line 40. Feedwater from the heat exchanger 12 is directed to a deaerator 11. In the deaerator, non-condensable gases, such as $CO_2$ and $O_2$, are stripped from the feedwater. Various types of deaerators can be used. In the embodiment illustrated herein, steam from the main boiler 10 is directed through steam line 46 to the deaerator 11 where steam contacts the feedwater flowing through the deaerator and removes certain gasses. From the deaerator 11, the feedwater is pumped by pump 31 to main boiler 10, waste heat boiler 7 or into a water injection line 48. A series of valves, valves 23A, 23B and 23C, control the flow of feedwater from pump 31 to the boilers 7 and 10, as well as to the water injection line 48. As seen in FIG. 1, pump 31 is operative to pump the boiler feedwater through valve 23A and through line 50 to the main boiler 10. In addition, pump 31 is operative to pump the feedwater through valve 23B and through line 52 to a tank 54 which is also communicatively connected to the steam line 44 leading from the waste heat boiler 7. Valve 23C controls the flow of feedwater from pump 31 through the water injection line 48. In practice, valve 23C is controlled or opened and closed by an actuator.

A steam line 58 extends from the main boiler 10 for conveying steam produced by the main boiler. Disposed in steam line 58 is a steam injector 8 which is also communicatively connected to a lower pressure steam line 60 (FIGS. 1-3) extending from tank 54. Various forms of steam injectors 8 can be employed. In one embodiment, the steam injector 8 takes the form of an eductor which is operative to induce steam produced by the waste heat boiler 7 from steam line 60 into the main steam line 58 where steam produced by the main boiler 10 and the waste heat boiler 7 are mixed.

Downstream of the steam injector 8 is a water injector 9 that is also disposed in the main steam line 58. Water injector 9 is communicatively connected to the water injection line 48. A valve 24 disposed in the water injection line 48 controls the flow of water to the water to injector 9. In one embodiment, a temperature sensor is associated with steam line 58 for sensing the temperature of the steam passing therethrough. When there is a need to cool the steam in steam line 58, the temperature sensor is operative to actuate the control valve 24 to reduce the temperature of the steam in line 58.

As seen in FIG. 1, steam that flows downstream of the water injector 9 is directed to the sludge-steam mixing unit 5 where it is injected and mixed with the sludge prior to the sludge being directed to the thermal hydrolysis batch reactors 1, 2 and 3.

FIG. 3 shows an alternate embodiment where steam line 58 leads to the conveyor 32 in hopper 4. Sometimes this is referred to as injecting steam into the "live bottom" of the hopper 4. In some embodiments, it is contemplated that the steam used to heat the sludge is injected into the "live bottom" of the hopper 4. In such cases, there may not be a sludge-steam mixing unit downstream. In other embodiments, a portion of the steam is routed from steam line 58 into steam line 62 which is operative to deliver steam to the sludge-steam mixing unit 5. In this embodiment, steam is directed at two points and the sludge is mixed with steam at the conveyor location, as well as in the sludge-steam mixing unit(s). See, for example, FIG. 3.

Turning now to embodiments shown in FIGS. 4-9, auxiliary or supplemental steam is produced by a flash tank 35 located downstream from the thermal hydrolysis system 102. In particular, hydrolyzed sludge from the batch reactors 1, 2, and 3 are directed into the flash tank 35. As discussed later, there is a control pressure drop between the thermal hydrolysis system 102 and the flash tank 35. Steam is flashed out of the flash tank 35 by a pressure reduction which occurs by controlling or opening valve 37. As shown in FIGS. 4-9, the flashed steam in flash tank 35 represents recovered energy from the thermal hydrolysis process and is used to heat succeeding batches of sludge in the batch reactors 1, 2, and 3.

Figure 4:
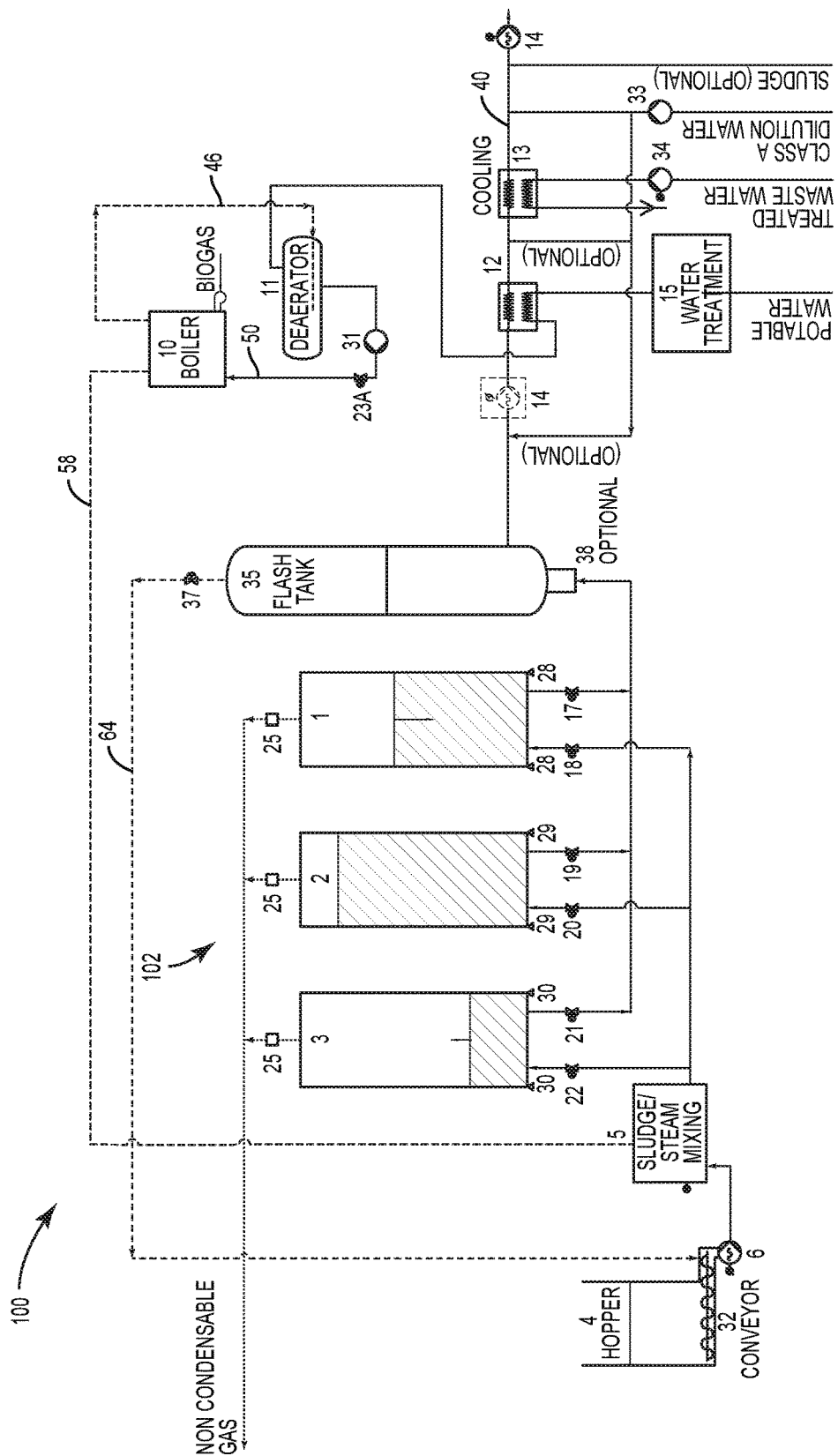
FIG. 4 is a schematic drawing showing an exemplary process employing a flash tank downstream from a thermal hydrolysis process.
Figure 5:
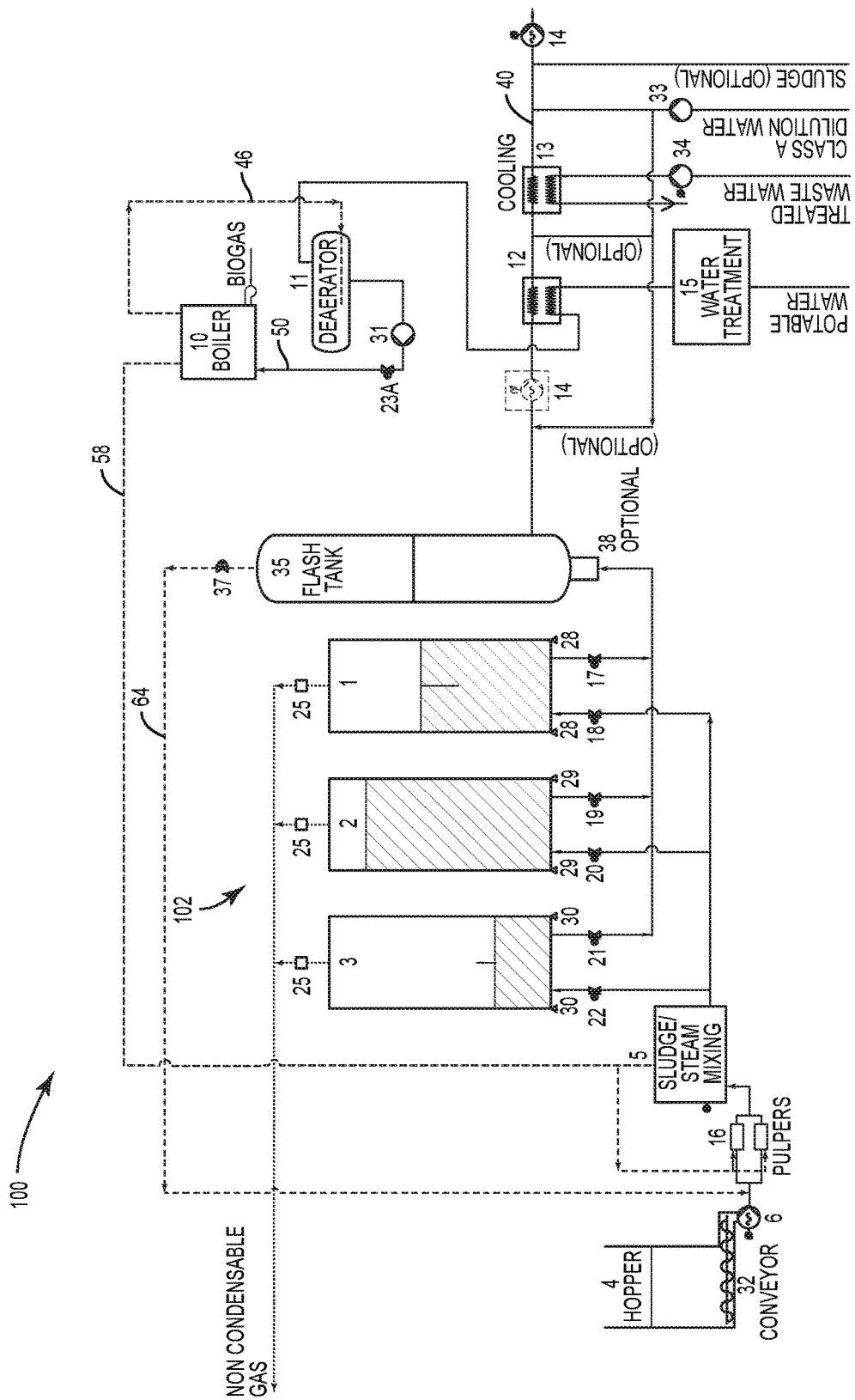
FIG. 5 is similar to FIG. 4 but shows an alternative embodiment.
Figure 6:
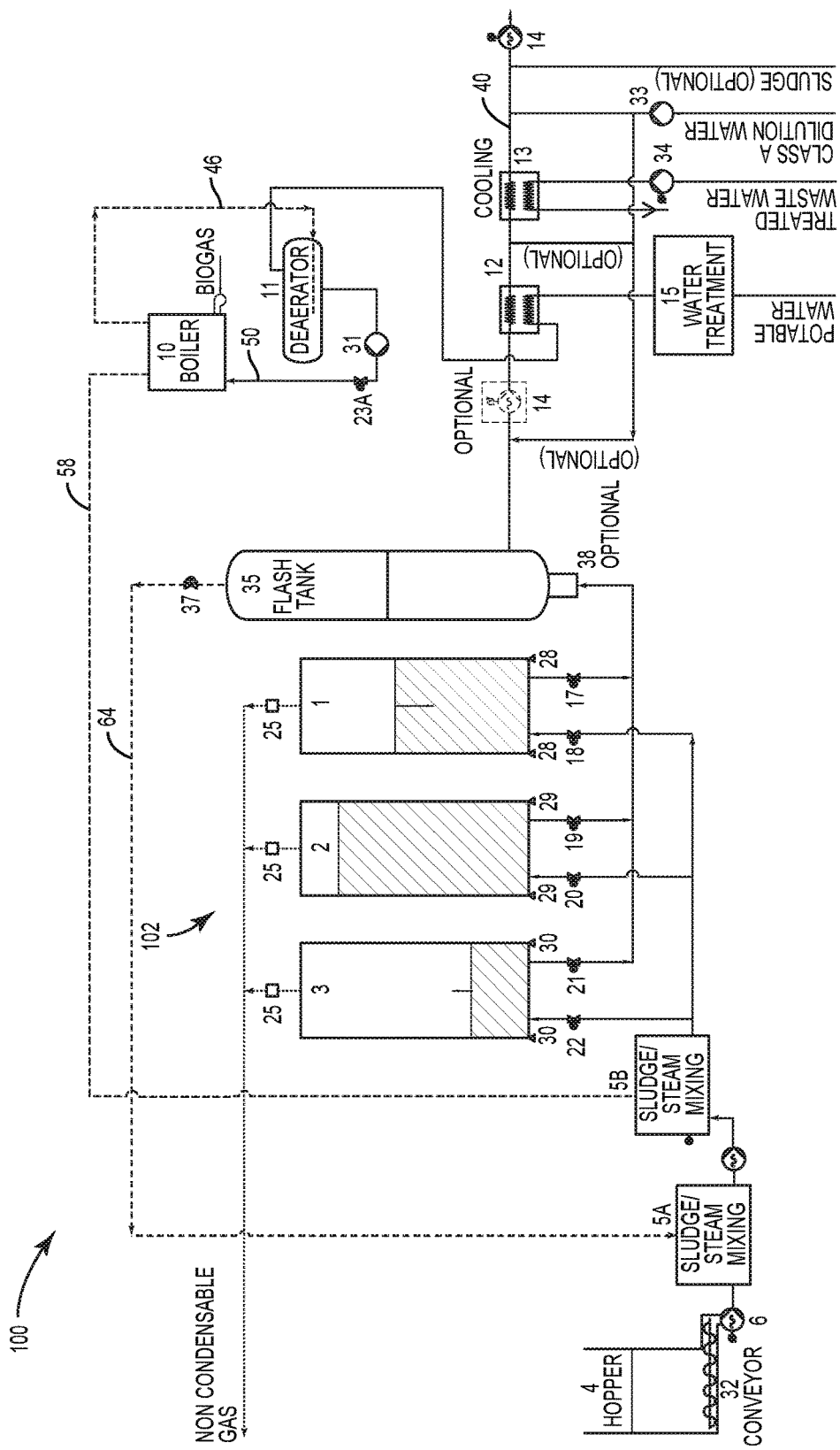
FIG. 6 is yet another alternative embodiment for a thermal hydrolysis process that employs a flash tank.
Figure 7:
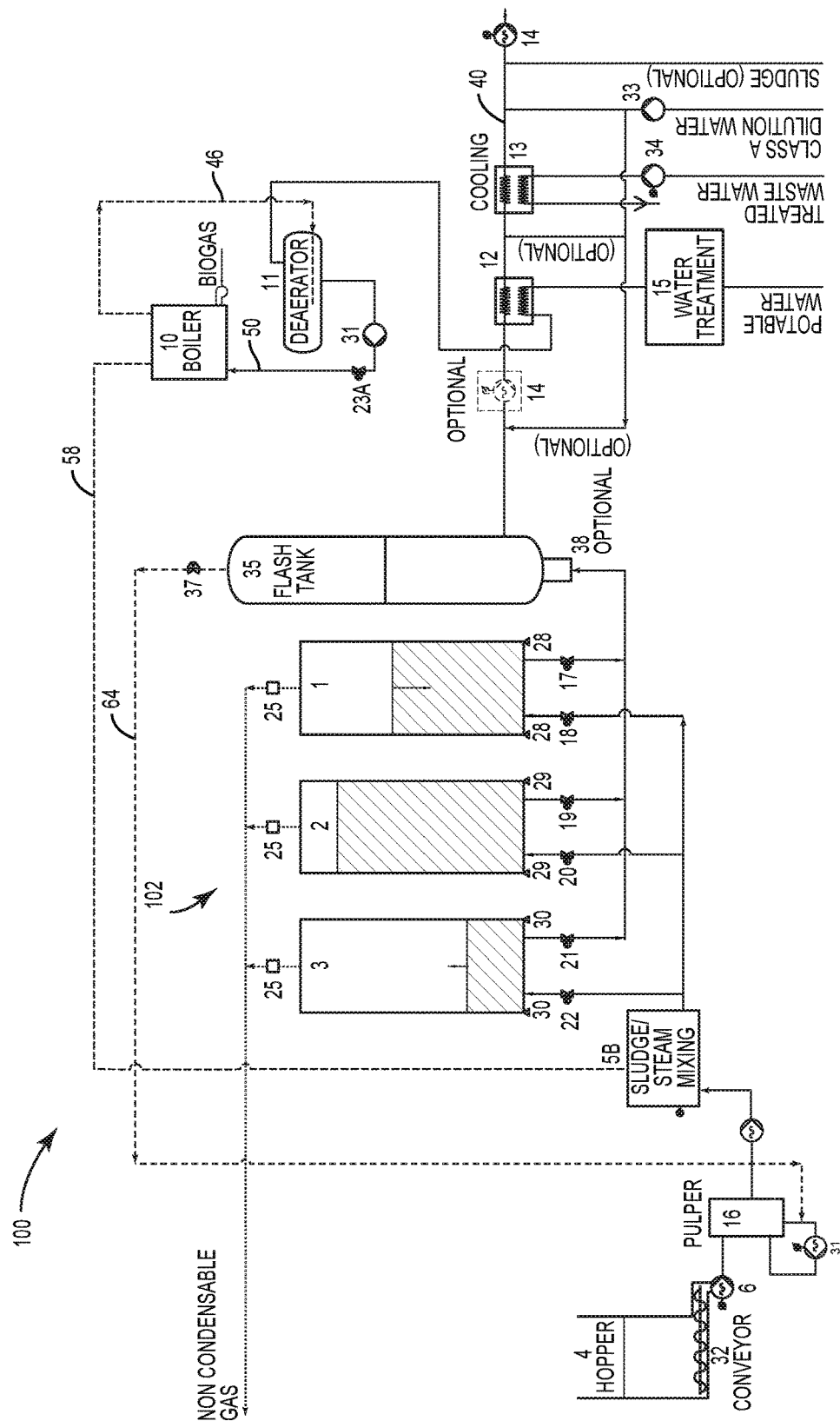
FIG. 7 is similar to FIGS. 4-6 but shows another alternative process.

In the FIG. 4 embodiment, steam from the flash tank 35 is connected through steam line 64 to the conveyor 32 or "live bottom" of hopper 4. Steam produced by the biogas boiler 10 is directed through line 58 to the downstream sludge-steam mixing unit 5. Therefore, in this case, steam is mixed with the sludge at two locations upstream of the thermal hydrolysis system 102. In the FIG. 5 embodiment, steam collected in the flash tank 35 is directed through line 64 to parallel pulpers 16 that are located between pump 6 and the sludge-steam mixing unit 5. Pre-heating tanks, like a pulper, will have a retention time of the sludge longer in comparison with the dynamic mixer. Mixing in pre-heating tanks or pulpers is usually provided by a recirculation pump. In this case, steam in the main live steam line 58 can be directed to the sludge-steam mixing unit 5 or to the parallel pulpers 16 or to both. Turning to the embodiment shown in FIG. 6, steam collected in the flash tank 35 is directed through line 64 to a first sludge-steam mixing unit 5A while steam from the main boiler 10 is directed to the downstream sludge-steam mixing unit 5B. Steam collected in the flash tank 35 of the FIG. 7 embodiment is directed through steam line 64 to a recirculation loop that includes pump 31. The recirculation loop is communicatively connected to the pulper 16 and recirculates sludge through the recirculation loop. Steam in the main live steam line 58 is directed to the downstream sludge-steam mixing unit 5.

Figure 8:
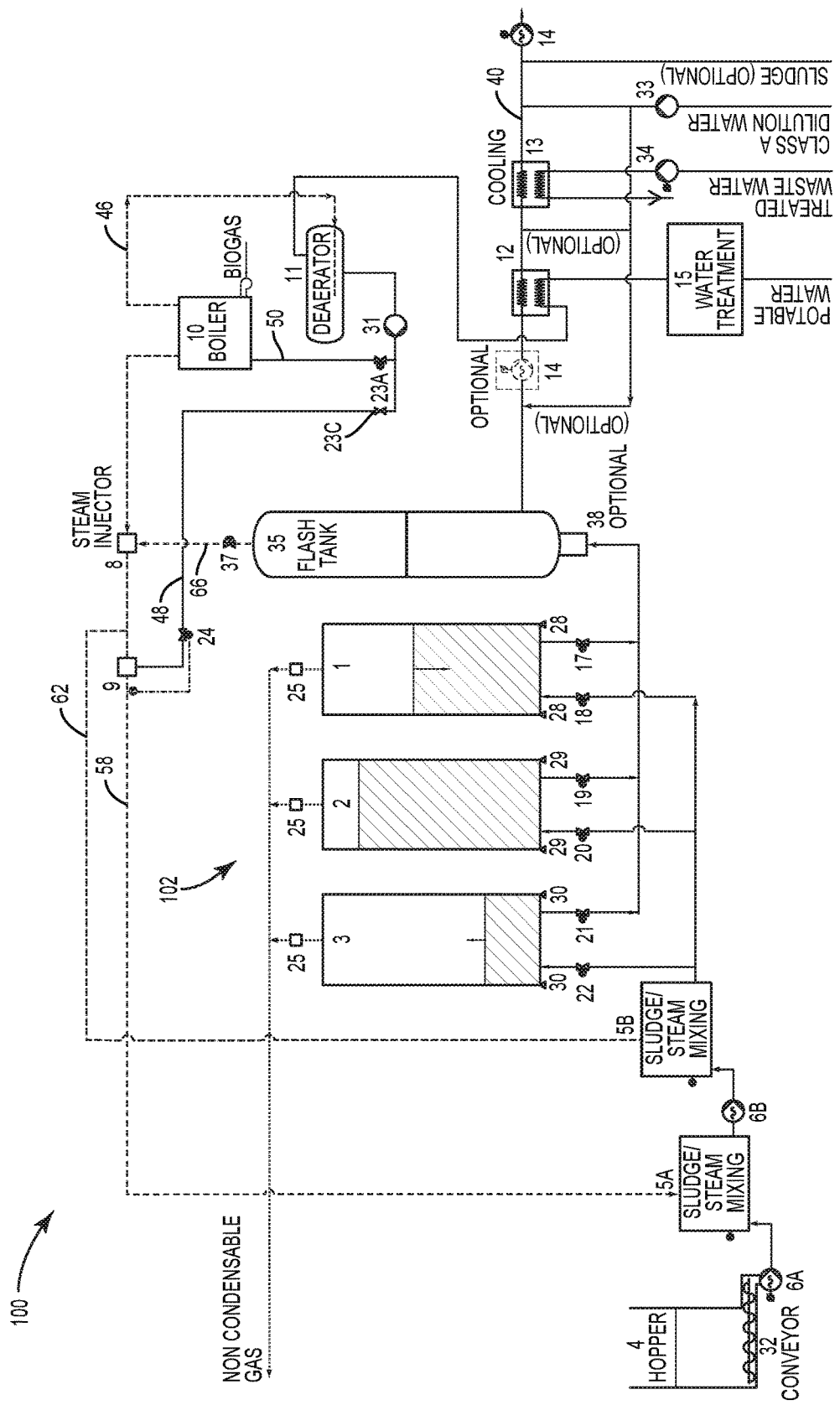
FIG. 8 shows another alternative process for employing a flash tank downstream of a thermal hydrolysis system for recovering heat energy.
Figure 9:
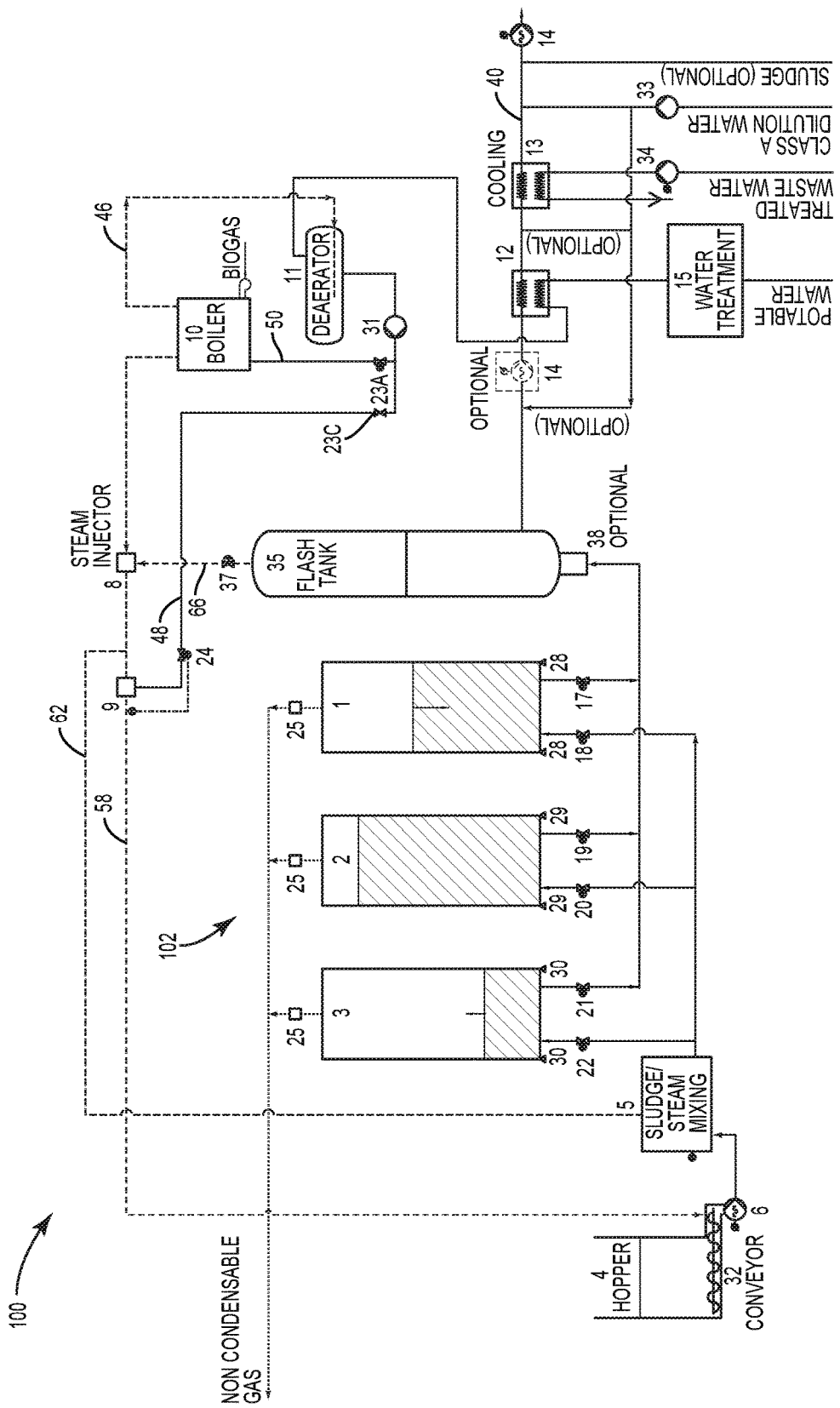
FIG. 9 is yet another alternative process that is similar in many respects to the processes shown in FIGS. 4-8.

The process depicted in FIG. 8 is similar in many respects to the process described above and shown in FIG. 2, with the exception that the waste heat boiler 7 is replaced by the flash tank 35. In the case of the FIG. 8 embodiment, steam discharged from the flash tank 35 is induced by a steam injector or eductor 8 from line 66 into the main steam line 58 where the flash steam mixes with the steam produced by the main boiler 10. In this case, the mixed steam in line 58 is directed to the first sludge-steam mixing unit 5A. A portion of the steam produced by the main boiler 10 can be diverted through line 62 to the second downstream sludge-steam mixing unit 5B. The embodiment shown in FIG. 9 is similar to that shown in FIG. 8 and discussed above, except that the combined steam in steam line 58 is directed to the "live bottom" of the hopper 4. A portion of the steam produced by the boiler 10 can be diverted through line 62 to the sludge-steam mixing unit 5.

Figure 10:
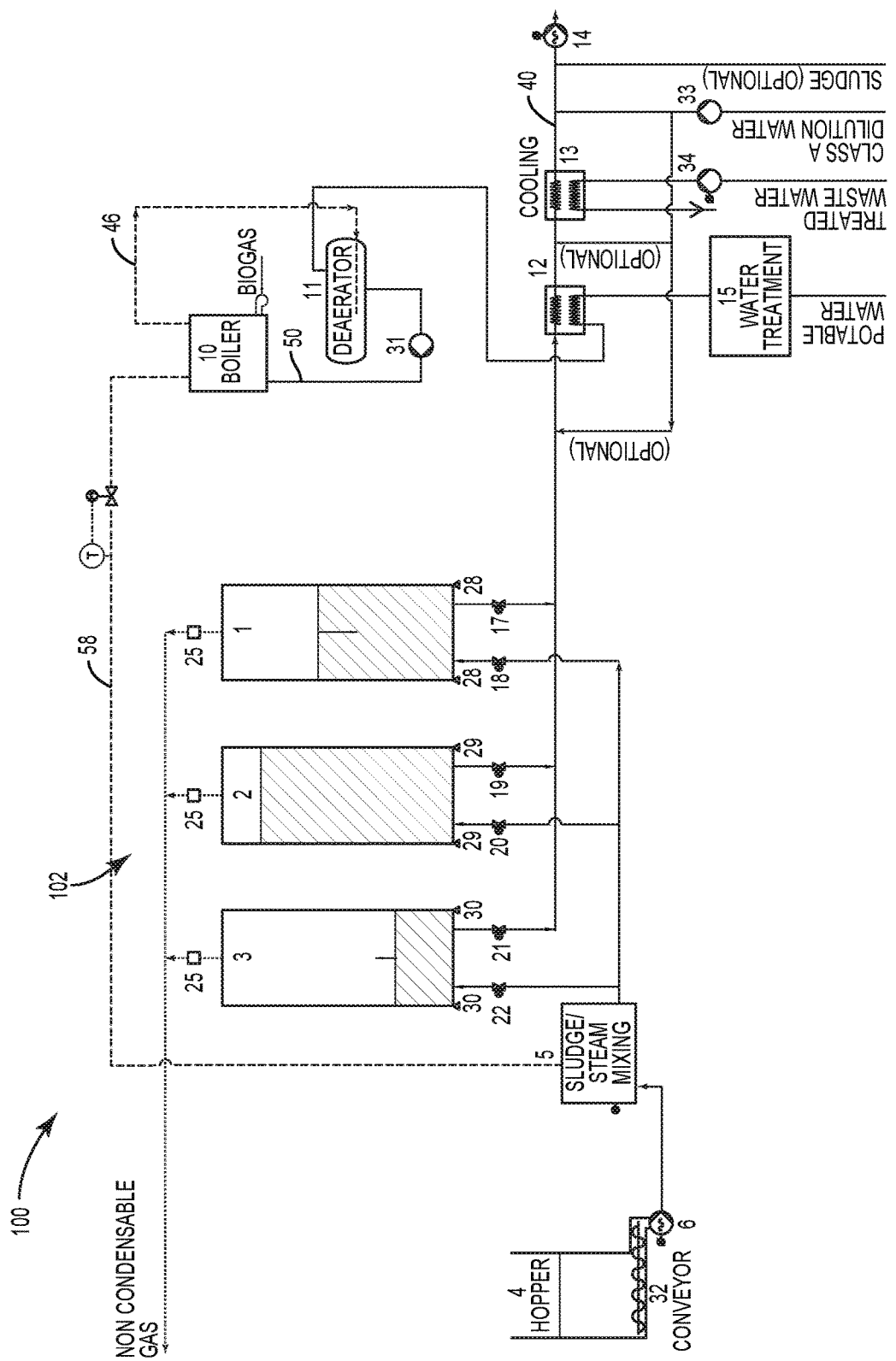
FIG. 10 is a schematic illustration of a thermal hydrolysis process that includes an efficient design for heating incoming sludge.
Figure 11:
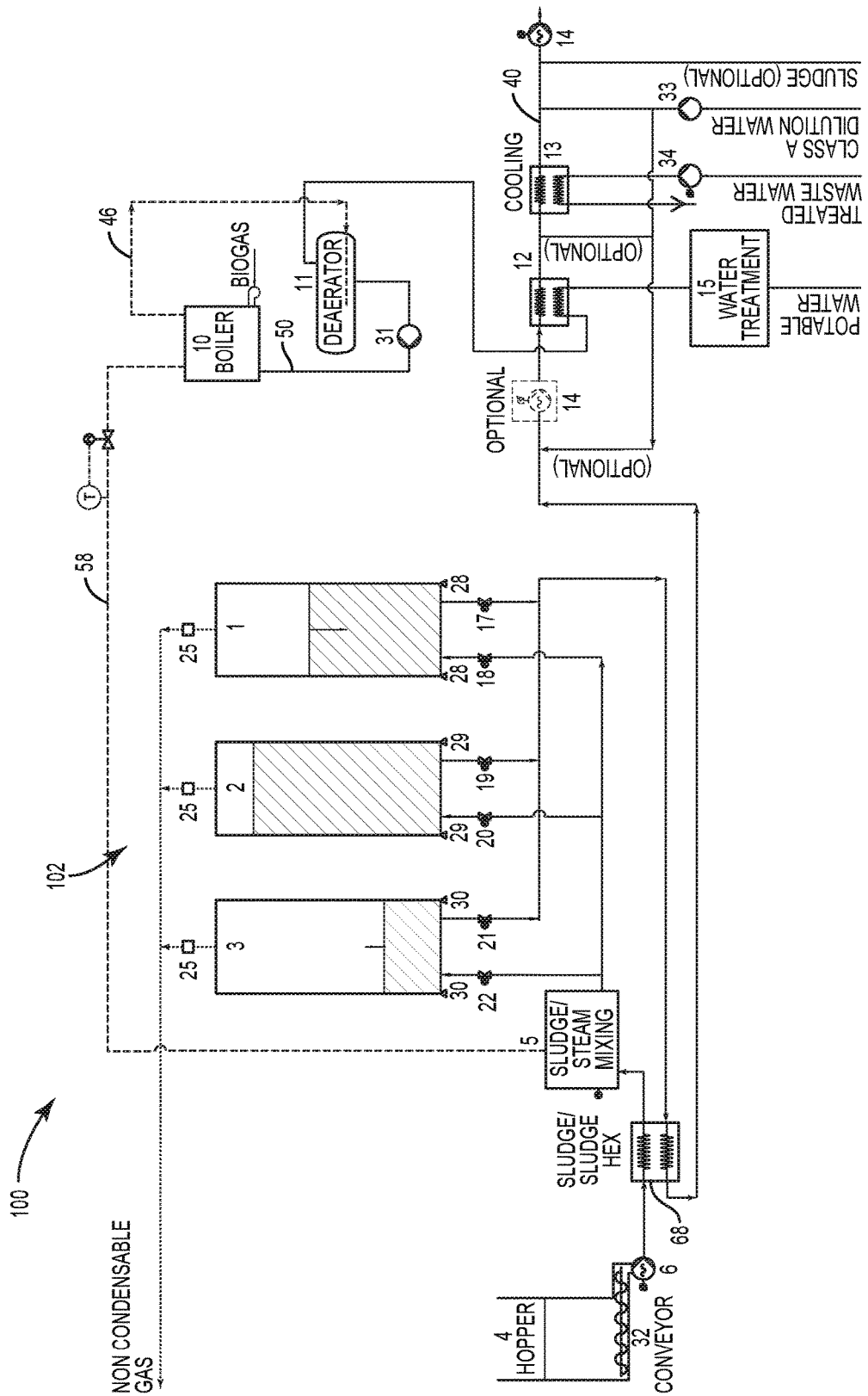
FIG. 11 depicts a process similar to that shown in FIG. 10.

The embodiment shown in FIG. 10 excludes both the waste heat boiler 7 and the flash tank 35. In this case, steam produced by the main boiler 10 is directed through line 58 to the sludge-steam mixing unit 5. In the embodiment illustrated in FIG. 11, the waste heat boiler 7 and flash tank 35 are not incorporated into the overall system and process. However, the hydrolyzed sludge is directed from the thermal hydrolysis system 102 to a heat exchanger 68 that is operative to transfer heat from the sludge outlet line 40 to a sludge inlet line that extends between pump 6 and the sludge-steam mixing unit 5.

Systems and processes discussed above are designed to obtain the lowest possible energy consumption in the course of thermally hydrolyzing sludge. This is made possible by optimizing the thermal hydrolysis process and recovering as much energy as possible. This is achieved, in part at least, by the employment of the waste heat boiler 7 or flash tank 35. In both cases, heat energy associated with the hydrolyzed sludge is used to generate auxiliary or supplemental steam that is combined with or used in conjunction with live steam produced by the main boiler 10.

Sludge from municipal or industrial wastewater treatment plants typically have a dry solids content between approximately 10% and approximately 40%. As discussed above, the sludge is mixed with steam at a point or points upstream of the thermal hydrolysis system 102. Typically the steam is at approximately 150° C. to approximately 200° C. When mixed with sludge, the average temperature of the sludge-steam mixture is typically 140° C.-180° C. As discussed above, the sludge-steam mixture can be implemented in several ways. These are illustrated in FIGS. 1-11. In some cases, the sludge and steam are mixed in identical steam-sludge mixers. In other cases, the steam is injected into the sludge and mixed therewith through an injection valve. In some embodiments, a pulper 16 or other convenient structure can be used to cause steam to be absorbed and mixed with the sludge. By adding the steam and heating the sludge, it follows that the viscosity of the sludge will decrease and hence the sludge will be more easily pumped or conveyed.

In the exemplary embodiments discussed herein, the sludge is fed to one of the at least three reactors or tanks 1, 2, and 3 depending on which tank is ready to receive the sludge. The sludge is retained in the tanks for approximately 10-20 minutes which, together with the high temperature of between 140° C.-180° C., insures the hydrolysis of the sludge. It follows that in the exemplary thermal hydrolysis process disclosed herein that each tank will operate in three modes: filling, retention and emptying. Reactors 1, 2, and 3 will preferably operate in parallel, which makes the overall process a continuous process. Each mode will occupy approximately 20 minutes. The pressure in each of the three reactors or tanks is defined by the temperature of the sludge, which at 165° C., will be approximately 7.0 bar absolute. One may also consider the pressure from the gases released by the heating of the sludge which is mainly carbon dioxide. Non-condensable gases will accumulate in the reactors over time. The top of each tank or reactor includes a device for venting the non-condensable gases generated during the course of the thermal hydrolysis process. Thus, the non-condensable gases will be vented during the operation of thermal hydrolysis system 102.

After sludge has been retained for 20 minutes in a respective tank, the sludge is directed out an outlet line and to the waste heat boiler 7. As noted before, the waste heat boiler 7 includes a series of tubes. In the case of one embodiment, the feedwater directed into the inlet 42 of the waste heat boiler 7 is directed into and through the tubes. The sludge, on the other hand, moves around the tubes and through the waste heat boiler 7. Heat from the hydrolyzed sludge is transferred through the walls of the tubes to the feedwater and, in a typical example, this produces saturated steam in the range of 130° C.-150° C. Hydrolyzed sludge leaves the waste heat boiler via line 40 and passes through heat exchangers 12 and 13. In a typical example, the hydrolyzed sludge flowing through the heat exchanger 12 will heat the boiler feedwater to approximately 95° C. before the boiler feedwater reaches the deaerator 11. The hydrolyzed sludge flowing through heat exchanger 13 will further cool the sludge. In addition, cooling or dilution water can be added to the sludge in sludge outlet line 40 so as to achieve a dry solids content in the range of 8%-10% and a temperature between approximately 35° C.-55° C., which is an appropriate temperature range for both thermophilic or mesophilic digestion. There are various means for assuring that the sludge flows through the waste heat boiler 7 and the two heat exchangers 12 and 13. It is contemplated that in some embodiments the pressure in the reactors 1, 2, and 3 is approximately 8 bar abs, which is sufficient to force the sludge through the waste heat boiler 7 and through the heat exchangers 12 and 13. In any event, pump 14, shown in the drawings, is a progressive cavity pump which will empty the tanks by a constant flow controlled by the level transmitter (load cells, for example) 28, 29 or 30 of each tank. If the pressure in the system is sufficient, then the progressive cavity pump 14 can be exchanged with a valve or another device which will maintain an appropriate pressure. It is appreciated that when one reactor is emptied, then the pressure above the liquid in the tank decreases, and at a certain level in the tank, the water in the tank will start to evaporate slowly to insure a balance between the liquid in the tank and the gasses above the liquid surface at the actual temperature. The evaporation of the water will cool the liquid approximately 1° C.-2° C. Then the temperature of the liquid will be decreased from approximately 165° C. to 163° C. during the emptying of the tanks.

There is a risk that the sludge flashes or boils in the pipes from the three reactors to the waste heat boiler 7. To avoid this risk of flash, it may be necessary to place the three reactors above the waste heat boiler 7. In this case, the static pressure in the liquid will prevent flashing in the piping system so long as the pressure drop in the pipe system is not excessive or too high.

As discussed above, a main boiler 10, which may be powered by biogas produced by an associated anaerobic digester, is used to generate a main steam stream. The feedwater to the boiler 10 is treated in water treatment unit 15 and pre-heated by heat exchanger 12. Various types of pre-treatment systems can be employed to remove, for example, hardness and other scaling or fouling species. For example, the boiler feedwater can be treated with various types of membrane separation units or ion exchanges. After leaving the heat exchanger 12, the feedwater is directed through the deaerator 11 where gasses are removed and from the deaerator at least a portion of the feedwater is pumped to the main boiler 10 via line 50. See FIG. 1, for example. In addition to feeding the boiler 10, the feedwater is directed into tank 54 and thereafter through line 56 into the feedwater inlet 42 of the waste heat boiler 7. As discussed above, the heat energy associated with the hydrolyzed sludge passing through the waste heat boiler 7 causes steam to be produced from the feedwater. Both boilers 7 and 10 produce saturated steam. Waste heat boiler 7, however, produces steam at a lower pressure than the main steam boiler 10. For example, the waste heat boiler 7 typically produces steam at 140° C.-150° C. while the main boiler 10 will produce saturated steam at 200° C.-220° C. Steam produced by the waste heat boiler 7 is boosted by the steam produced by the main steam boiler 10. That is, by employing the injector system or eductor 8, steam produced by the waste heat boiler 7 is injected into steam line 58 where it mixes with the steam generated by the boiler 10. If the temperature of the combined steam is above a threshold, then the combined steam can be cooled by injecting feedwater from line 48 into the main steam line 58 as shown in FIG. 1. As discussed above, the steam produced by the waste heat boiler 7 and main boiler 10 is routed to a point or points upstream of the thermal hydrolysis system 102 to form a sludge-steam mixture.

With respect to the embodiments employing the waste heat boiler 7 (embodiments shown in FIGS. 1-3), during startup, the steam supply is derived totally from the steam boiler 10. This is the case until the waste heat boiler 7 comes into operation and is able to generate steam. Once the waste heat boiler 7 is in operation, it will continuously take on more of the load. Once in full operation or in a steady state of operation, the waste heat boiler will supply approximately 35%-40% of the steam required to be mixed with the incoming sludge and the remainder will be supplied by the main boiler 10.

Turning to the embodiments shown in FIGS. 4-9, the processes shown therein are similar in many respects to the processes shown in FIGS. 1-3 but wherein the waste heat boiler 7 is replaced by the flash tank 35. In the embodiments of FIGS. 4-9, hydrolyzed sludge is directed from the thermal hydrolysis system 102 and particularly from reactors 1, 2 and 3 to the flash tank 35. The pressure in the flash tank is maintained between approximately 1.4 and 2.7 bar, which corresponds to a temperature range of 110° C.-130° C. The pressure in the flash tank 35 is controlled by regulating the valve 37 to maintain a generally constant pressure in the flash tank 35. There are various approaches to controlling the continuous flow of sludge from the three reactors 1, 2 and 3 to the flash tank 35. In one approach there is provided a continuous flow of sludge to the flash tank 35 controlled by a "static pressure loss" with feature 38 (a fixed orifice, for example) together with valves 17, 19 and 21. Here the main pressure drop is over the "static pressure loss" and the flow is controlled by the valves 17, 19, and 21. Another way of controlling the flow of sludge from the reactors 1, 2 and 3 to the flash tank 35 is an approach that does not employ the "static pressure loss". This approach includes repeatedly opening and closing the valves 17, 19, and 21. That is, one valve is open for a short period which will result in a relatively large flow to the flash tank 35 for a short period of time. Then the valve will be closed and there will, of course, be no flow to the flash tank 35. This process of repeatedly opening and closing these valves is repeated over a selected period of time. The operation of these two approaches is controlled by the load sensors or level transmitters 28, 29, and 30 associated with the reactors 1, 2, and 3.

Flash steam discharged from the flash tank 35 is used in a manner similar to how the steam produced by the waste heat boiler 7 is used. That is, flash steam discharged from the flash tank 35 is combined with steam produced by the main boiler 10 or, in some cases, used independently to heat incoming sludge to the thermal hydrolysis system 102. For example, in the embodiment shown in FIG. 4, the steam produced by the flash tank is directed through line 64 to the "live bottom" of the hopper 4 where the steam is mixed with incoming sludge. Steam from the boiler 10 is directed through line 58 to the downstream sludge-steam mixing unit 5. In the embodiments shown in FIG. 5, steam from the flash tank 35 is directed through line 64 to parallel pulpers 16. Steam produced by the boiler 10 is directed through line 58 to either the sludge-steam mixing unit 5 or to the pulpers 16 or to both. In the case of the embodiment shown in FIG. 6, steam produced by the flash tank 35 is directed through line 64 to a first sludge-steam mixing unit 5A while steam produced by the boiler 10 is directed to the downstream sludge-steam mixing unit 5B. In the FIG. 7 embodiment, steam from the flash tank is directed through line 64 to a recycle line associated with the pulper 16. Again, sludge produced by the boiler 10 is directed through line 58 to the sludge-steam mixing unit 5.

The embodiment shown in FIG. 8 is similar in many respects to the embodiment shown in FIG. 2 and discussed above except that the waste heat boiler 7 is replaced by the flash tank 35. In any event, flash steam from the flash tank 35 is induced through line 66 by the steam injector 8 and caused to mix in line 58 with steam produced by the boiler 10. The combined steam in line 58 is directed to a first sludge-steam mixing unit 5A while a portion of the steam produced by the boiler 10 is diverted through line 62 to the second sludge-steam mixing unit 5B. The embodiment shown in FIG. 9 is similar in many respects to the embodiment of FIG. 8 except that the combined steam in line 58 is directed to the "live bottom" of the hopper 4. In other words, the steam is injected into a portion of the conveyor housing and mixed with the sludge being conveyed by the conveyor 32. The diverted portion of steam produced by the boiler 10 is directed to the sludge-steam mixing unit 5.

There are many advantages to the systems and processes discussed above. First, the systems and processes provide an efficient use of energy. Both the waste heat boiler 7 and the flash tank 35 are incorporated and used to recover a substantial amount of energy that would otherwise be lost. Once recovered, the energy is continuously converted to steam and efficiently mixed with the incoming sludge. Secondly, the entire system is easy and economical to maintain. For example, by mixing steam with the sludge outside of the thermal hydrolysis reactors substantially reduces maintenance problems and costs.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An energy efficiency method for thermally hydrolyzing sludge comprising:
    directing sludge into a sludge-steam dynamic mixing unit;
    from the sludge-steam dynamic mixing unit, directing the sludge to a downstream thermal hydrolysis system and thermally hydrolyzing sludge to form thermally hydrolyzed sludge;
    feeding a first feed water to a main boiler and producing live steam;
    utilizing the heat associated with the thermally hydrolyzed sludge and a waste heat boiler to generate supplemental steam by:
        i. directing the thermally hydrolyzed sludge into and through a waste heat boiler;
        ii. feeding a second feed water through a series of tubes extending through the waste heat boiler while directing the thermally hydrolyzed sludge through the waste heat boiler where the thermally hydrolyzed sludge moves around the tubes, resulting in the second feed water in the tubes being heated to produce the supplemental steam;
    directing the supplemental steam produced in the waste heat boiler to a tank;
    directing the live steam from the main boiler through a steam line having an eductor therein;
    inducing the supplemental steam produced by the waste heat boiler and contained in the tank into the eductor in the steam line and wherein the eductor injects the supplemental steam into the steam line and mixes the supplemental and live steam to form a steam mixture in the steam line; and
    directing the steam mixture into the sludge-steam dynamic mixing unit located upstream of the thermal hydrolysis system and mixing the steam mixture with the sludge therein.

2. The method of claim 1 including cooling the steam mixture in the steam line by injecting water into the steam line downstream from the steam injector.

3. The method of claim 1 wherein there is provided a main feed water stream and wherein the first and second feed waters are split from the main feed water stream and wherein the method includes splitting a third feed water from the main feed water stream and cooling the steam mixture by mixing the third feed water with the steam mixture.

4. The method of claim 1 including heating the second feed water passing through the tubes in the waste heat boiler such that the supplemental steam is a saturated steam having a temperature in the range of 130° C. to 150° C.

5. The method of claim 1 including sensing the temperature of the steam mixture in the steam line at a point downstream from the steam injector and injecting water into the steam line to cool the steam mixture when the temperature of the steam mixture exceeds a threshold value.

6. The method of claim 1 including directing the thermally hydrolyzed sludge into an upper portion of the waste heat boiler and downwardly therethrough past the series of tubes containing the second feed water, and directing the thermally hydrolyzed sludge from a lower portion of the waste heat boiler and through one or more cooling heat exchangers to an anaerobic digester.

7. The method of claim 1 including a sludge hopper disposed upstream of the sludge-steam dynamic mixing unit and wherein the method includes splitting the steam mixture into first and second streams and directing one stream into the hopper and mixing the one stream with sludge in the hopper and directing the other stream to the sludge-steam dynamic mixing unit where the other stream is mixed with the sludge in the sludge-steam dynamic mixing unit.

8. An energy efficiency method for thermally hydrolyzing sludge comprising:
    directing sludge into one or more steam-sludge mixers;
    from the steam-sludge mixer, directing the sludge to a downstream thermal hydrolysis system and thermally hydrolyzing sludge to form thermally hydrolyzed sludge;
    feeding a first feed water to a main boiler and producing live steam;
    utilizing the heat associated with the thermally hydrolyzed sludge to generate supplemental steam by:
        i. directing the thermally hydrolyzed sludge into and through a waste heat boiler;
        ii. feeding a second feed water into and through the waste heat boiler and heating the feed water to produce the supplemental steam;
    directing the live steam from the main boiler through a steam line having a steam injector therein;
    injecting the supplemental steam produced by the waste heat boiler into the steam line via the steam injector and mixing the supplemental and live steam to form a steam mixture in the steam line; and
    directing the steam mixture into the steam-sludge mixer located upstream of the thermal hydrolysis system and mixing the steam mixture with the sludge therein.

9. The method of claim 8 including cooling the steam mixture in the steam line by injecting water into the steam line downstream from the steam injector.

10. The method of claim 8 wherein the one or more steam-sludge mixers includes first and second dynamic mixers upstream of the thermal hydrolysis system and the method includes splitting the steam mixture into first and second steam mixture streams and directing the first steam mixture stream into the first dynamic mixer and mixing the first steam mixture stream with the sludge therein and directing the second steam mixture stream into the second dynamic mixer and mixing the second steam mixture stream with the sludge therein.

11. The method of claim 8 wherein the waste heat boiler includes a series of tubes extending through the waste heat boiler, and the method includes directing the supplemental steam from the waste heat boiler to a tank and directing the supplemental steam from the tank to the steam injector located in a steam line and wherein the steam injector injects the supplemental steam into the steam line and mixes the supplemental steam with the live steam passing through the steam line.

12. The method of claim 8 wherein the first and second feed waters are split from the main feed water stream and wherein the method includes splitting a third feed water from the main feed water stream and cooling the steam mixture by mixing the third feed water with the steam mixture.

13. The method of claim 8 including heating the second feed water passing through the tubes in the waste heat boiler such that the supplemental steam is a saturated steam having a temperature in the range of 130° C. to 150° C.

14. The method of claim 8 including sensing the temperature of the steam mixture in the steam line at a point downstream from the steam injector and injecting water into the steam line to cool the steam mixture when the temperature of the steam mixture exceeds a threshold value.

15. An energy efficient method for thermally hydrolyzing sludge, comprising:
    directing the sludge into a first steam-sludge mixer and mixing supplemental steam with the sludge in the first steam-sludge mixer;
    after mixing supplemental steam with the sludge in the first steam-sludge mixer, directing the sludge from the first steam-sludge mixer to a second downstream steam-sludge mixer;
    directing a feedwater to a main boiler and producing live steam;
    directing the live steam from the main boiler to the second steam-sludge mixer and mixing live steam with the sludge in the second steam-sludge mixer whereby the sludge, in moving from the first steam-sludge mixer to the second steam-sludge mixer, is first mixed with supplemental steam and thereafter mixed with live steam;
    directing the sludge from the second steam-sludge mixer to a thermal hydrolysis system comprising a series of batch reactors and through a batch process, thermally hydrolyzing the sludge in the series of batch reactors to produce thermally hydrolyzed sludge;
    directed the thermally hydrolyzed sludge from the batch reactors to a flash tank;
    providing a pressure drop between the thermal hydrolysis system and a flash tank and generating flash steam that constitutes the supplemental steam;
    directing the supplemental steam from the flash tank to the first steam-sludge mixer where the supplemental steam is mixed with the sludge: and
    directing the thermally hydrolyzed sludge from the flash tank and cooling the thermally hydrolyzed sludge downstream of the flash tank.

16. The method of claim 15 wherein the first steam-sludge mixer comprises a pulper that mixes the supplemental steam with the sludge.

17. The method of claim 16 wherein the pulper includes a recirculation loop and wherein the supplemental steam is injected into the circulation loop.

18. The method of claim 15 wherein at least one of the first or second steam-sludge mixers is a dynamic mixer.

19. The method of claim 15 including directing biogas to the main boiler and utilizing the biogas as an energy source for heating the feedwater in the main boiler.

20. The method of claim 19 further including deaerating the feedwater prior to the feedwater reaching the main boiler.

21. The method of claim 15 including controlling the pressure drop between the thermal hydrolysis system and the flash tank by adjusting a valve associated with the flash tank.

22. The method of claim 15 including heating successive batches of sludge with the supplemental steam before the sludge is subjected to live steam.

23. The method of claim 15 wherein the live steam is not mixed with the sludge in the batch reactors as the mixing of the live steam with the sludge occurs upstream of the batch reactors.

24. The method of claim 15:
including reducing the viscosity of the sludge in the first steam-sludge mixer by causing the supplemental steam to be absorbed and mixed with the sludge in the first steam-sludge mixer; and
reducing the viscosity of the sludge in the second steam-sludge mixer by causing the live steam to be absorbed and mixed with the sludge in the second steam-sludge mixer.

* * * * *